(12) United States Patent
Oki (10) Patent No.: US 7,121,742 B2
(45) Date of Patent: Oct. 17, 2006

(54) OPTICAL MODULE

(75) Inventor: Kazushige Oki, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 16 days.

(21) Appl. No.: 10/655,589

(22) Filed: Sep. 5, 2003

(65) Prior Publication Data
US 2004/0197056 A1 Oct. 7, 2004

(30) Foreign Application Priority Data
Sep. 6, 2002 (JP) ............................ P2002-262006

(51) Int. Cl.
*G02B 6/42* (2006.01)
(52) U.S. Cl. .............................. 385/92; 385/88; 385/89
(58) Field of Classification Search ............. 385/53–94
See application file for complete search history.

(56) References Cited

U.S. PATENT DOCUMENTS

| | | | |
|---|---|---|---|
| 6,335,869 B1 | 1/2002 | Branch et al. | |
| 6,445,475 B1 | 9/2002 | Okubora et al. | |
| 6,556,445 B1 * | 4/2003 | Medina | 361/728 |
| 6,600,611 B1 | 7/2003 | Inujima et al. | |
| 6,830,383 B1 * | 12/2004 | Huang | 385/92 |
| 6,863,448 B1 * | 3/2005 | Chiu et al. | 385/88 |
| 6,893,168 B1 * | 5/2005 | Huang et al. | 385/92 |
| 2002/0154362 A1 | 10/2002 | Okl et al. | |
| 2003/0063424 A1 | 4/2003 | Inujima et al. | |

FOREIGN PATENT DOCUMENTS

| | | |
|---|---|---|
| JP | 61-149129 | 9/1988 |
| JP | 2-17862 | 2/1990 |
| JP | 5-291693 | 11/1993 |
| JP | 2001-091795 | 4/2001 |
| JP | 2002-15450 | 1/2002 |

* cited by examiner

*Primary Examiner*—Sung Pak
*Assistant Examiner*—Tina M. Wong
(74) *Attorney, Agent, or Firm*—McDermott Will & Emery LLP (57) ABSTRACT

Provided is an optical module which can be efficiently manufactured. The optical module of the present invention comprises a housing having a lower casing, an upper casing, and a cover; an optical sub-assembly; a circuit board; and a block. The lower casing includes a receptacle mating with an optical connector, and a mount. The upper casing engages with the lower casing. The cover covers the upper casing. The optical sub-assembly optically couples with the optical connector in the receptacle. The circuit board is electrically connected to the optical sub-assembly and mounted to the mount of the lower casing. The block is mounted to the lower casing, and defines relative positions of the lower casing, upper casing, optical sub-assembly, and circuit board.

11 Claims, 11 Drawing Sheets

OPTICAL MODULE

BACKGROUND OF THE INVENTION

1. Field of the Invention

The present invention relates to an optical module including a positioning member for positioning an optical device and a circuit board formed with a circuit for driving the optical device.

2. Related Background Art

Known is an optical module constituted by a circuit board implemented with an optical sub-assembly and its driving circuit, a signal amplifying circuit, and the like, and a housing enclosing them. This optical module comprises a receptacle for receiving an optical connector provide data leading end of an optical fiber, whereby optical coupling is achieved between the optical sub-assembly and the optical connector within the receptacle. For optical coupling, the position of the optical sub-assembly must be determined with respect to the optical connector. For positioning the optical sub-assembly with respect to the receptacle, conventional optical modules form the receptacle with an opening for inserting the optical sub-assembly and insert the optical device into the opening, while defining the shape of the receptacle such that the relative position of the optical connector is determined with respect to the opening, whereby optical coupling is achieved between them (see, for example, U.S. Pat. No. 6,335,869).

Figure 10:
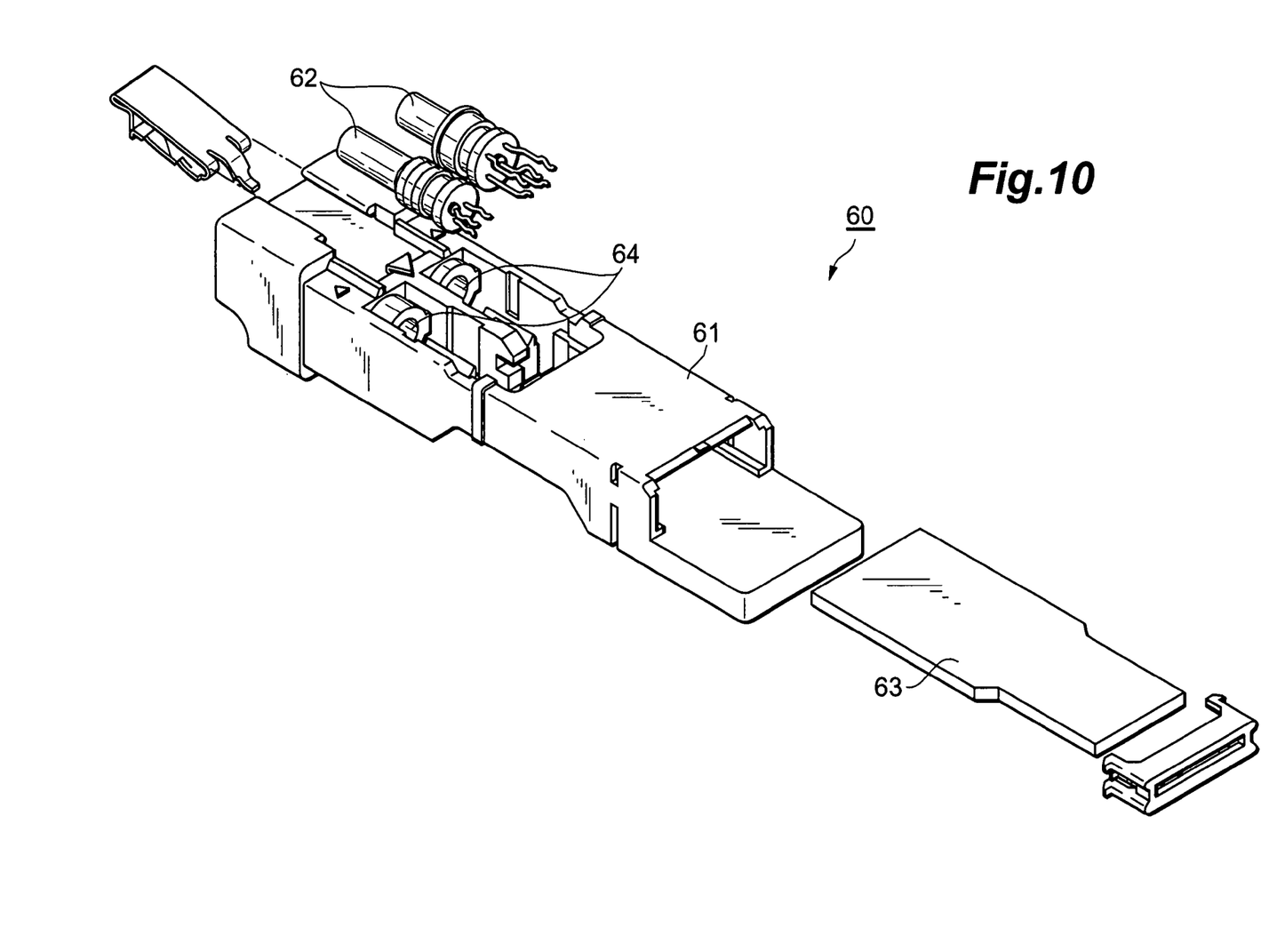
FIG. 10 is a perspective view showing a conventional optical module.

FIG. 10 is an exploded perspective view showing an example of a conventional optical module 60. Conventionally, optical sub-assemblies 62 are inserted into openings 64 of a housing 61, a circuit board 63 is enclosed in the housing 61, and then lead pins of the optical sub-assemblies 62 and the circuit board 63 are fixed to each other.

SUMMARY OF THE INVENTION

However, assembly efficiency is inferior in the method comprising the steps of separately setting the optical sub-assemblies 62 and the circuit board 63 into the housing 61 and then bonding them to each other.

Therefore, it is an object of the present invention to provide an optical module having an efficient assembling procedure.

The optical module in accordance with one aspect of the present invention comprises a housing having a lower casing including a receptacle to mate with an optical connector, and a mount, an upper casing to engage the lower casing, and a cover for covering the upper casing; an optical sub-assembly optically coupling with the optical connector in the receptacle; a circuit board electrically connected to the optical sub-assembly and mounted on the mount of the lower casing; and a block, mounted on the lower casing, for defining relative positions of the lower casing, upper casing, optical sub-assembly, and circuit board.

According to the present invention, the block can position the circuit board and optical sub-assembly, whereby the circuit board and the optical sub-assembly can be positioned with respect to the upper and lower casings together with the block. Hence, prior to the completion of assembling, the circuit board and the optical sub-assembly can be fixed to each other in the final positional relationship, thus providing an optical module with efficient assembling.

The optical module in accordance with another aspect comprises an optical sub-assembly mounted with an optical device; a circuit board electrically connected to the optical sub-assembly; a lower casing having a receptacle for receiving an optical connector holding an optical fiber, and a mount for mounting the circuit board; an upper casing to engage the lower casing; and a resin block for defining positions of the optical sub-assembly, circuit board, lower casing, and upper casing. The receptacle includes an abutting surface having an opening for receiving one end of the optical sub-assembly. The block comprises a front wall including one surface, in contact with the abutting surface, having an opening corresponding to the opening of the receptacle and receiving one end of the optical sub-assembly; a center wall; and a pair of side walls disposing the center wall therebetween. The center wall has a supporting portion for holding the circuit board. Each of the pair of side walls has a pressing portion for pressing the circuit board. Holding the circuit board between the supporting portion and pressing portions defines relative positions of the block and circuit board. The mount in the lower casing provides a projection. The block is held between one side face of the projection and the abutting surface. A side wall of the block provides a first cutout. A side wall of the lower casing provides a second cutout. The upper casing is formed with first and second protrusions. The first and second cutouts engage with the first and second protrusions, respectively, thereby defining relative positions of the lower casing, upper casing, and block.

According to this aspect, inserting the optical sub-assembly into the opening of the front wall and holding the circuit board between the supporting portion and pressing portions can position the optical sub-assembly and circuit board with respect to the block. Therefore, before being assembled into the casings, the circuit board and the optical sub-assembly can be fixed to each other in the final positional relationship within the casings. Also, holding the block between the abutting surface of the receptacle and the projection in the lower casing can easily position the block with respect to the lower casing. Further, causing the first and second cutouts to engage with the first and second protrusions, respectively, can easily determine the relative positions of the lower casing, upper casing, and block. Hence, an optical module with easily assembled configuration.

The optical module in accordance with still another aspect comprises an optical sub-assembly having an optical device; a circuit board electrically connected to the optical sub-assembly; a lower casing having a receptacle for receiving an optical connector holding an optical fiber, and a mount for mounting the circuit board; an upper casing to engage with the lower casing; and a resinblock for defining positions of the optical sub-assembly, circuit board, lower casing, and upper casing. The receptacle includes an abutting surface having an opening for receiving one end of the optical sub-assembly. The block comprises a front wall including one surface, in contact with the abutting surface, having an opening corresponding to the opening of the receptacle and receiving one end of the optical sub-assembly; a center wall; and a pair of side walls disposing the center wall therebetween. The center wall has a supporting portion for holding the circuit board. Each of the pair of side walls has a pressing portion for pressing the circuit board. Holding the circuit board between the supporting portion and pressing portions defines relative positions of the block and circuit board. An inner face of the upper casing provides a projection. The center wall of the block provides a cutout. One surface of the proof section and one surface of the cutout of the center wall come into contact with each other, whereby the block is held between the projection and the abutting surface of the receptacle. A side wall of the block provides a first cutout. A side wall of the lower casing provides a second cutout.

The upper casing provides first and second protrusions. The first and second cutouts engage with the first and second protrusions, respectively, thereby defining relative positions of the lower casing, upper casing, and block.

According to this aspect, inserting the optical sub-assembly into the opening of the front wall and holding the circuit board between the supporting portion and pressing portions can position the optical sub-assembly and circuit board with respect to the block. Therefore, before being assembled in the casings, the circuit board and the optical sub-assembly can be fixed to each other in the final positional relationship within the casings. Also, holding the block between the abutting surface of the receptacle in the lower casing and the projection in the upper casing can easily position the block with respect to the lower casing. Further, engaging the first and second cutouts with the first and second protrusions, respectively, can easily determine the relative positions of the lower casing, upper casing, and block. Hence, an optical module which can be easily assembled is provided.

DESCRIPTION OF THE PREFERRED EMBODIMENTS

In the following, preferred embodiments of the positioning member and optical module of the present invention will be explained in detail with reference to the drawings. In the explanation, elements identical to each other will be referred to with numerals identical to each other without overlapping descriptions.

First Embodiment

Figure 1:
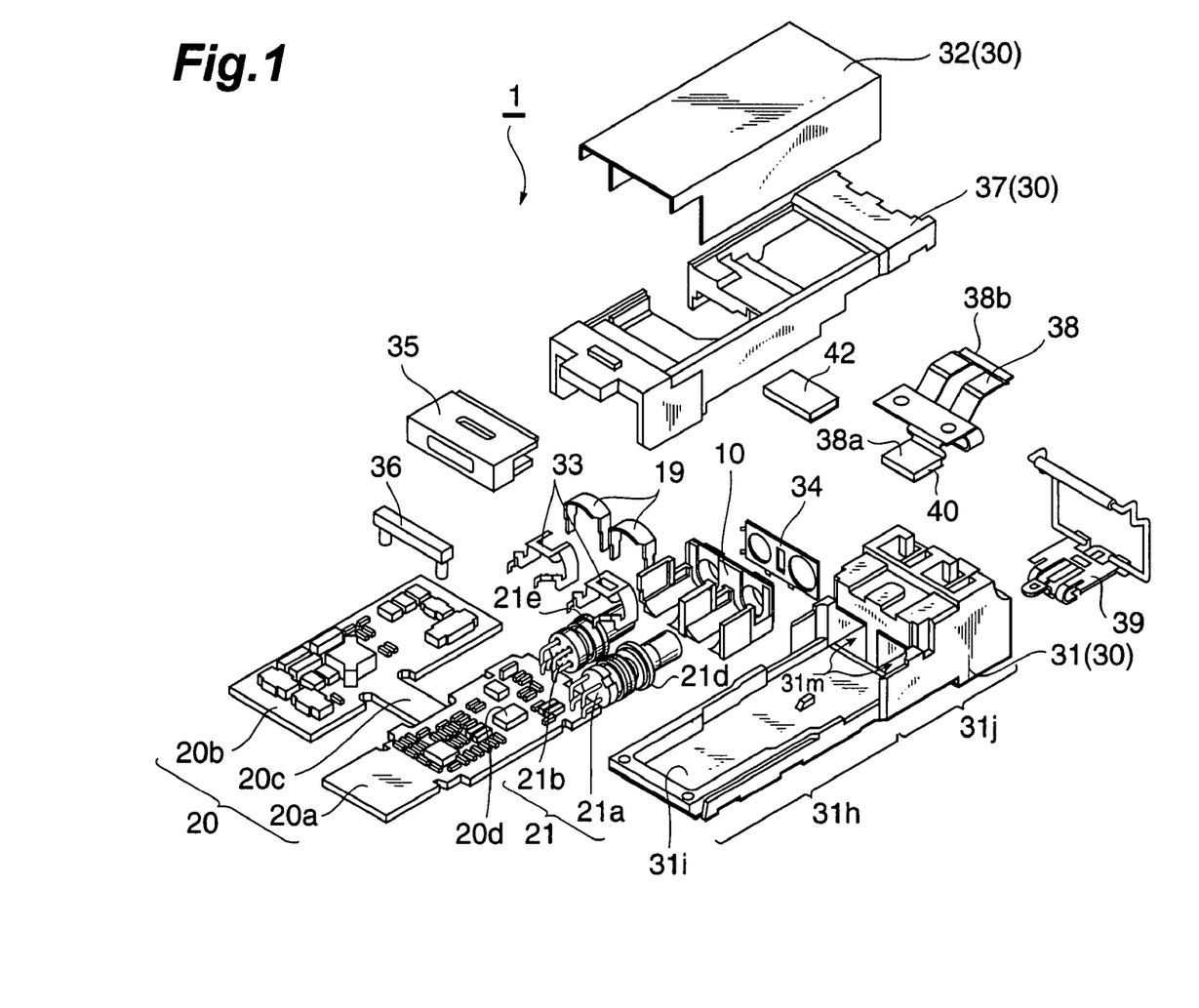
FIG. 1 is an exploded perspective view showing the optical module in accordance with a first embodiment.
Figure 2:
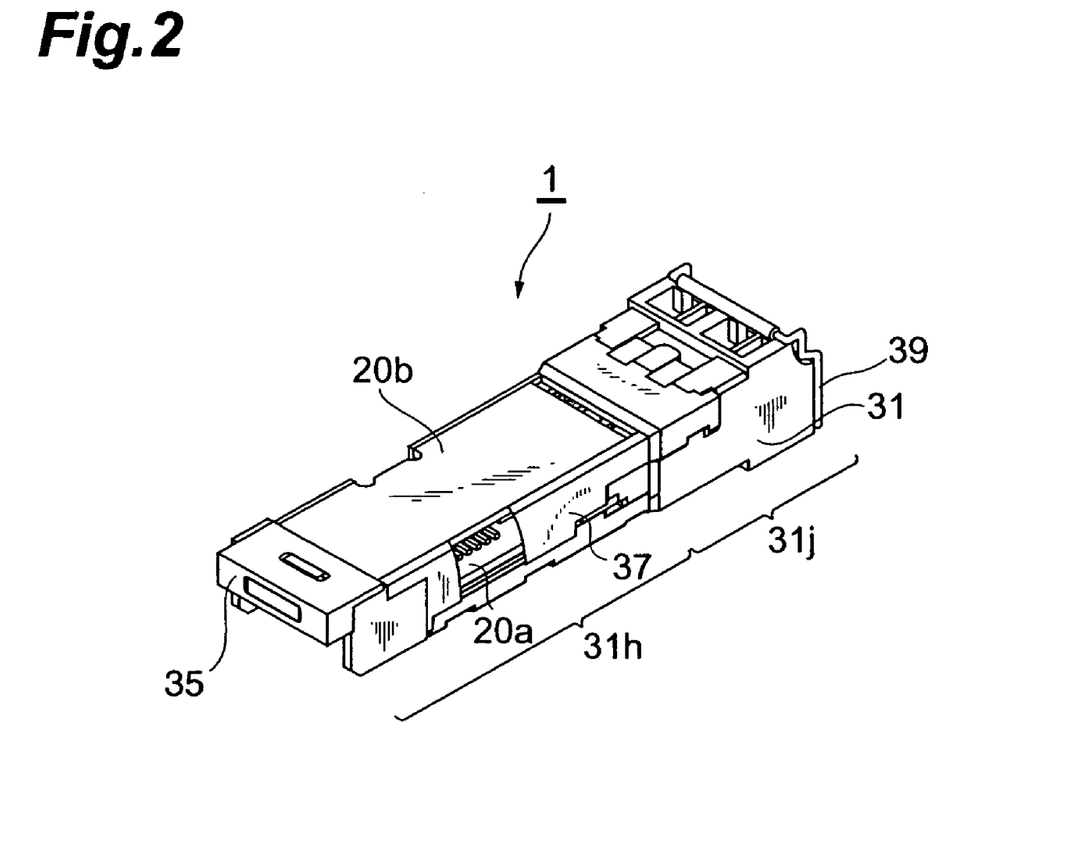
FIG. 2 is a perspective view showing the optical module in accordance with the first embodiment.

The optical module 1 of a first embodiment of the present invention will be explained. FIG. 1 is an exploded perspective view of the optical module 1, whereas FIG. 2 is a perspective view of the optical module 1. The optical module 1 comprises a transmitting optical sub-assembly 21a and a receiving optical sub-assembly 21b (collectively referred to as "optical sub-assembly 21"), a circuit board 20 on which is formed a circuit for driving the optical sub-assembly 21, and a housing 30 for encasing the optical sub-assembly 21 and circuit board 20. The optical sub-assembly 21 and the circuit board 20 are electrically connected to each other by leads extending from the optical sub-assembly 21.

The housing 30 comprises a lower casing 31 for receiving the optical sub-assembly 21 and circuit board 20, an upper casing 37, and a cover 32 for covering the lower casing 31 and upper casing 37.

The lower casing 31 has a mount 31h for mounting the block 10, including a mounting surface 31i for mounting the circuit board 20, and a receptacle 31j disposed at one end of the mount 31h.

The receptacle 31j has openings 31m. Each opening 31m receives a leading end of the optical sub-assembly 21. An optical fiber held by an optical connector inserted into the receptacle 31j from the other end is optically coupled to the optical sub-assembly 21 within the opening 31m. In this embodiment, the receptacle 31j is formed with two openings 31m for receiving the transmitting optical sub-assembly 21a and receiving optical sub-assembly 21b, respectively.

The transmitting optical sub-assembly 21a and the receiving optical sub-assembly 21b are inserted into the openings 31m formed in the lower casing 31, whereas the circuit board 20 mounted on the mount 31h of the lower casing 31 is stopped by a substrate stopper 36, whereby the optical sub-assembly 21 and circuit board 20 are secured to the lower casing 31.

The circuit board 20 comprises a first substrate 20a and a second substrate 20b. The first substrate 20a and second substrate 20b are connected to each other by a flexible substrate 20c. When the circuit board 20 is assembled in the housing 30, the flexible substrate 20c is bent such that the first substrate 20a and second substrate 20b faces each other. This can realize a two-story structure as shown in FIG. 2.

The optical module 1 includes a block 10 for positioning the optical sub-assembly 21 and circuit board 20, and holders 19 for securing the optical sub-assembly 21 with respect to the block 10. The optical module 1 also includes brackets 33 and a shield 34 which are used for reducing noise affecting the optical sub-assembly 21. The optical module 1 further includes a cap 35 attached to an end portion opposite from the receptacle 31j of the lower casing 31, a fin 38, and an actuator 39 for releasing the engagement with a host board to which the optical module 1 is mounted.

Specifically, the brackets 33 are attached to the outer surface of the optical sub-assembly 21. The shield 34 has a substantially planar shape and has holes through which end portions of the optical sub-assembly 21 can pass. The shield 34 is attached to one surface of the block 10 which will be explained later.

The fin 38 transmits the heat generated by the transmitting optical sub-assembly 21a itself to the outside of the optical module 1. One end 38a of the fin 38 is disposed at the outer surface of the transmitting optical sub-assembly 21a, whereas the other end 38b is in contact with the upper face of the receptacle 31j. For enhancing adhesion to the transmitting optical sub-assembly 21a, a silicone sheet 40 is attached to one end 38a. For enhancing thermal conductivity, the silicone sheet 40 may contain metal fillers.

Figure 3A:
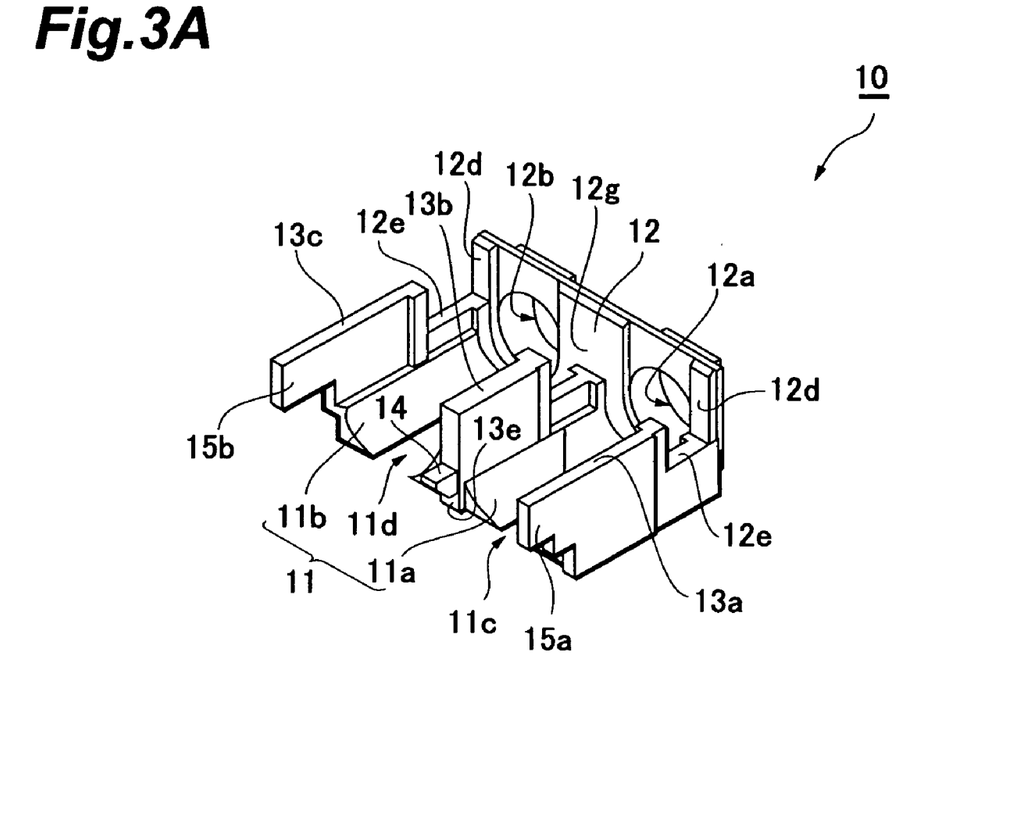
FIGS. 3A and 3B are perspective views showing a block.
Figure 3B:
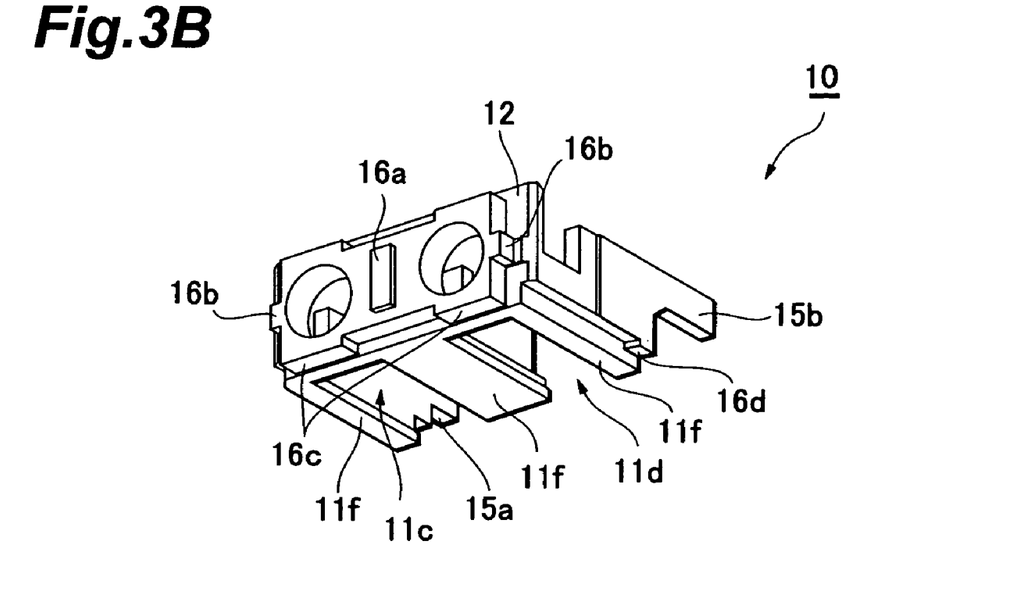

FIGS. 3A and 3B are perspective views showing the block 10 as seen from respective directions different from each other. As shown in FIG. 3A, the block 10 comprises a mount 11 for mounting the optical sub-assembly 21, a front wall 12 disposed at one end of the mount 11, a substrate supporting portion 14 disposed at the other end of the mount 11, and a substrate pressing portion 15. The block 10 is molded from a resin.

The mount 11 is divided into a first region 11a for mounting the transmitting optical sub-assembly 21a, and a second region 11b for mounting the receiving optical sub-assembly 21b.

The front wall 12 is formed with openings 12a, 12b into which respective head portions of the transmitting optical sub-assembly 21a and receiving optical sub-assembly 21b placed on the mount 11 can be inserted. Each of the transmitting optical sub-assembly 21a and receiving optical sub-assembly 21b has a substantially cylindrical form. The transmitting optical sub-assembly 21a and receiving optical sub-assembly 21b have respective flanges 21d, 21e, which come into contact with the front wall 12.

The first region 11a and second region 11b of the mount 11 have respective cutouts 11c, 11d. Since the mount 11 has cutouts 11c, 11d, the optical sub-assembly 21 is stably placed on the mount 11. The mount 11 has a semicircular cross section so as to conform to the outer shape of the optical sub-assembly 21.

The side wall 13 is constituted by a pair of outer walls 13a and 13c, and a center wall 13b formed therebetween for partitioning the first region 11a and second region 11b.

A portion of an end face of the center wall 13b projects, so as to form the substrate supporting portion 14. The circuit board 20 is to be positioned on the substrate supporting portion 14. End faces of the outer walls 13a and 13c partly project, thereby forming substrate pressing portions 15a and 15b. The rear face of the circuit board 20 is supported by the substrate supporting portion 14, whereas its front face is pressed by the substrate pressing portions 15a, 15b, whereby the circuit board 20 is positioned.

FIGS. 3A and 3B show a configuration in which the substrate supporting portion 14 is formed in the center wall 13b, whereas the substrate pressing portions 15a, 15b are formed in the outer walls 13a, 13c, respectively. However, the substrate supporting portion 14 may be formed in both of the outer walls 13a, 13c, whereas the center wall 13b may have a substrate pressing portion. The substrate pressing portions 15a, 15b, and the substrate supporting portion 14 may be provided in the same wall as well.

Figure 4:
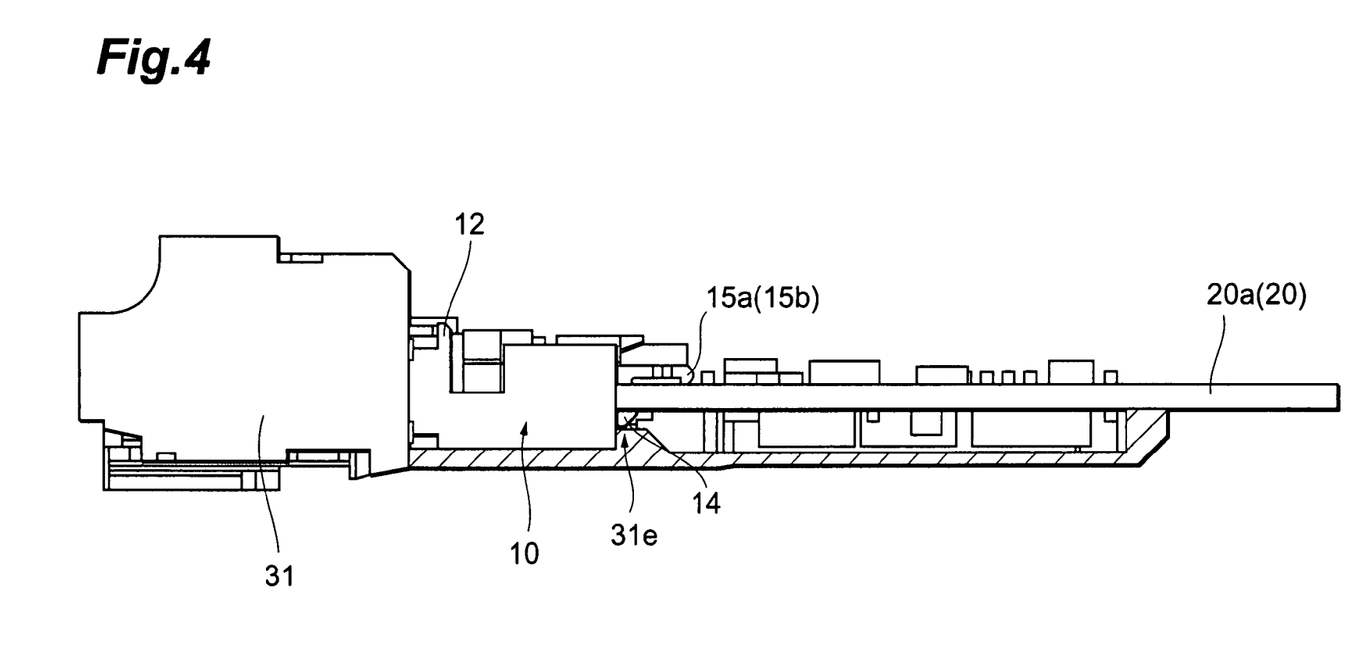
FIG. 4 is a side view showing a state where an optical sub-assembly is accommodated in a lower casing.

FIG. 4 is a side view showing an arrangement where the optical sub-assembly 21 and circuit board 20 positioned by the block 10 are assembled in the lower casing 31. This drawing does not depict the second substrate 20b and flexible substrate 20c. Referring to FIG. 4, the first substrate 20a is positioned by the substrate supporting portion 14 at the rear face and by the substrate pressing portions 15a, 15b at the front face.

A method of assembling the optical module 1 will be now explained. First, the transmitting optical sub-assembly 21a and receiving optical sub-assembly 21b are inserted into the openings 12a, 12b formed in the front wall 12 of the block 10, and are pressed against and secured to the front wall 12 by the holders 19. Subsequently, the circuit board 20 is inserted between the substrate supporting portion 14 and substrate pressing portions 15a, 15b of the block 10.

Figure 5A:
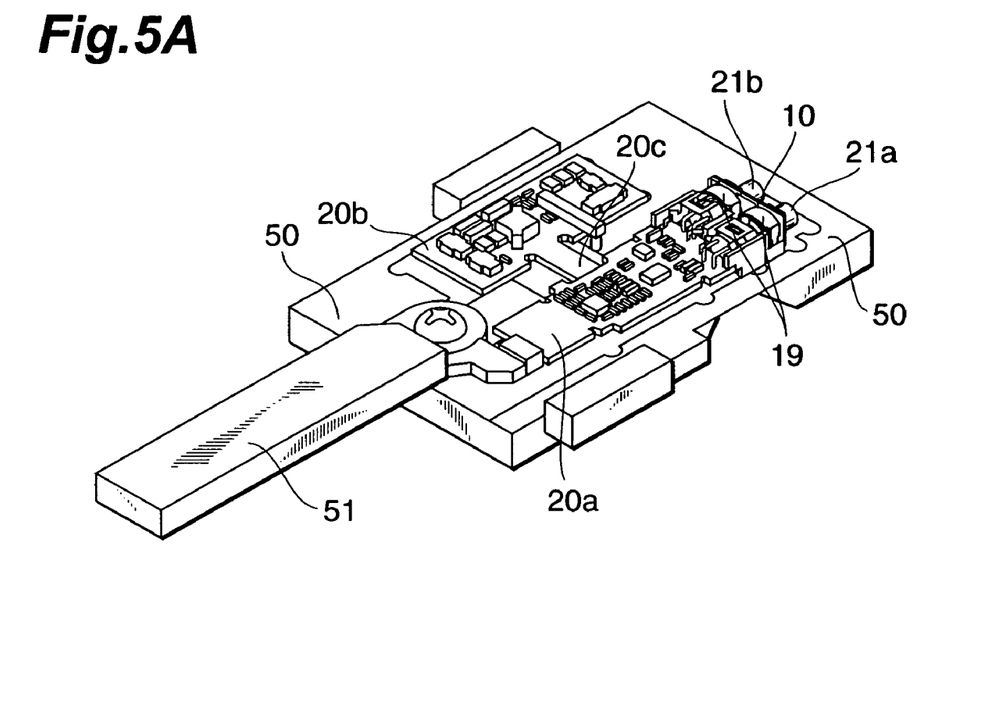
FIGS. 5A and 5B are views showing respective steps of making the assembly.
Figure 5B:
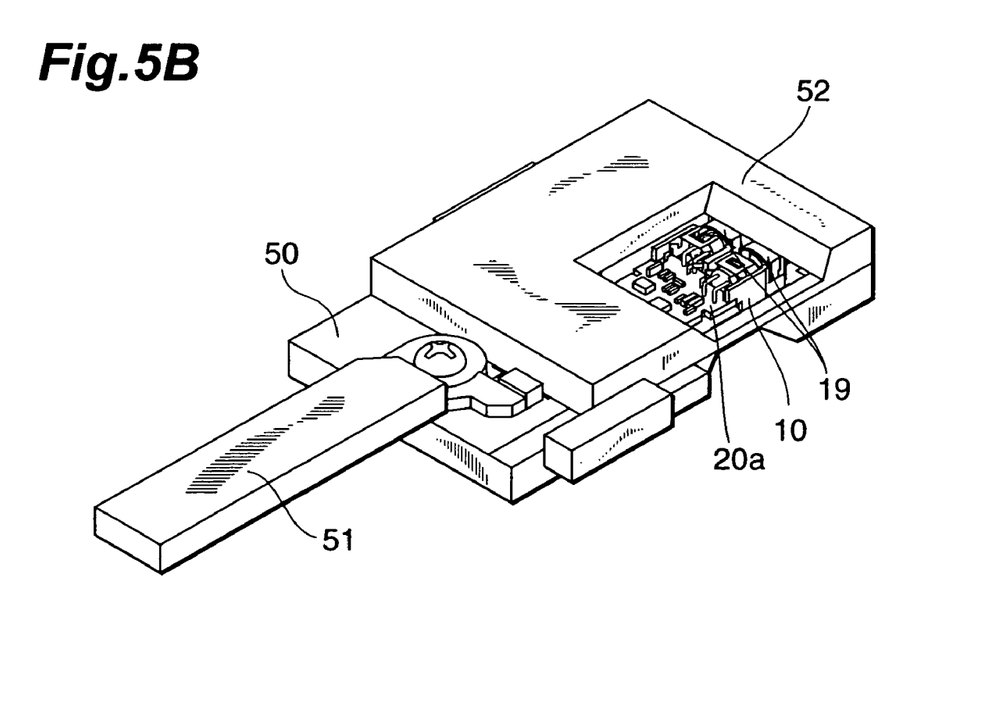
Figure 6:
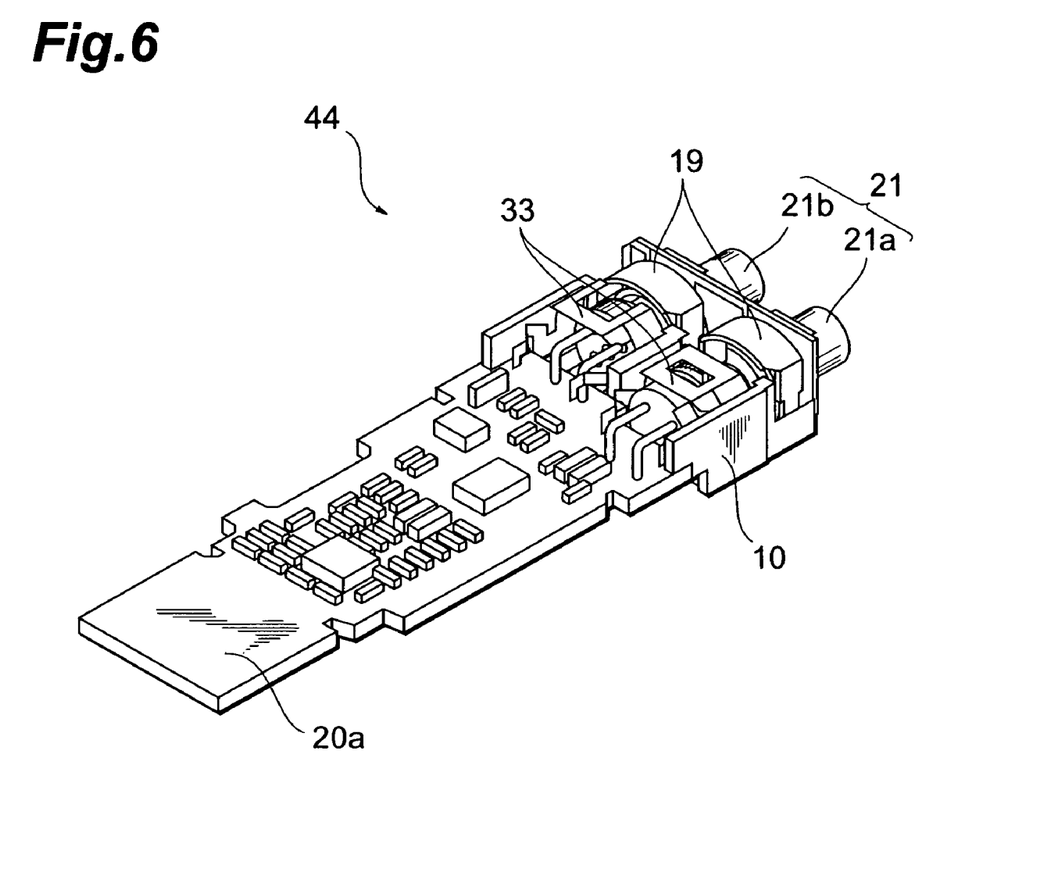
FIG. 6 is a perspective view showing the assembly.

Then, the optical sub-assembly 21 and circuit board 20 positioned by the block 10 are set to a jig 50 as shown in FIG. 5A. Thereafter, the jig 50 is covered with a cover 52 as shown in FIG. 5B, and leads of the optical sub-assembly 21 and the circuit board 20 are connected to each other with solder. Here, the brackets 33 are also attached to the optical sub-assembly 21. FIG. 6 shows an assembly 44 manufactured by the foregoing process. This drawing does not depict the second substrate 20b and the flexible substrate 20c.

Figure 7:
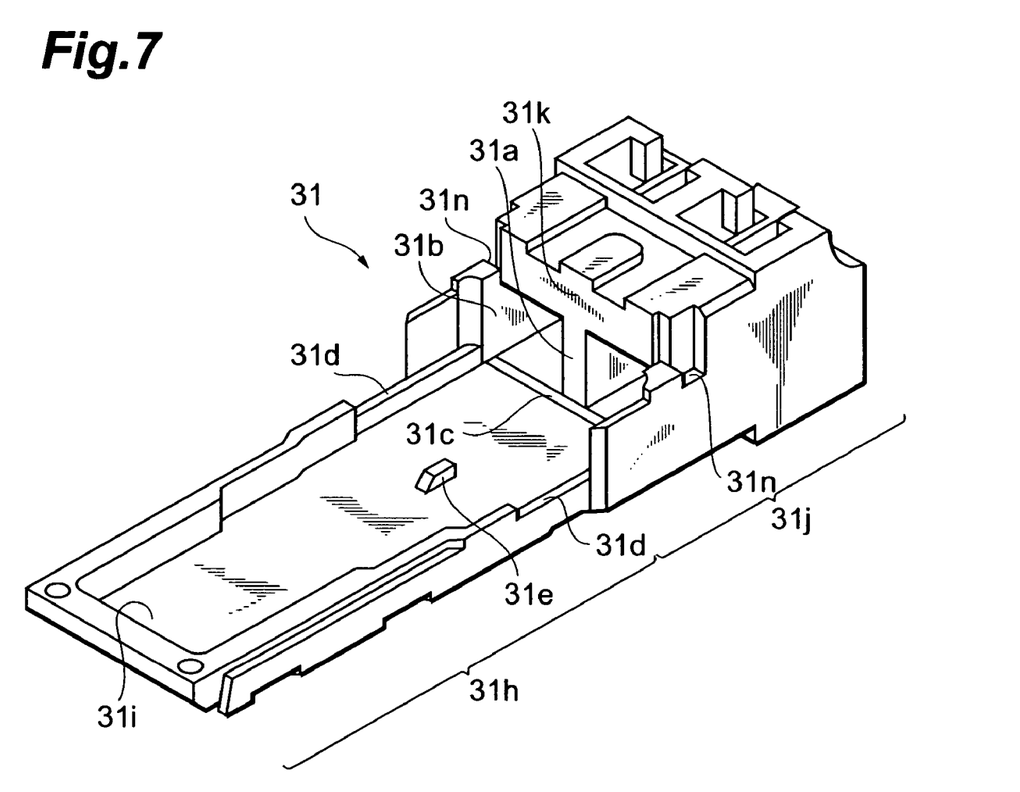
FIG. 7 is a partial perspective view showing the lower casing in the first embodiment.

Subsequently, the assembly 44 is set in the lower casing 31. FIG. 7 is a partial perspective view showing the lower casing 31. The mounting surface 31i of the lower casing 31 has a projection 31e matching the substrate supporting portion 14 of the block 10.

The projection 31e comes into contact with a lower portion of the substrate supporting portion 14, i.e., a surface 13e positioned under the substrate supporting portion 14 pf the center wall 13b in FIG. 3B.

The projection 31e and the surface 13e of the block 10 come into contact with each other, thereby positioning the block 10 with respect to the lower casing 31. Namely, the block 10 is secured between one end part 31k of the receptacle 31j and the projection 31e.

Since the block 10 is thus positioned with respect to the lower casing 31, the optical sub-assembly 21 and circuit board 20 secured to the block 10 are also positioned with respect to the lower casing 31.

Figure 8A:
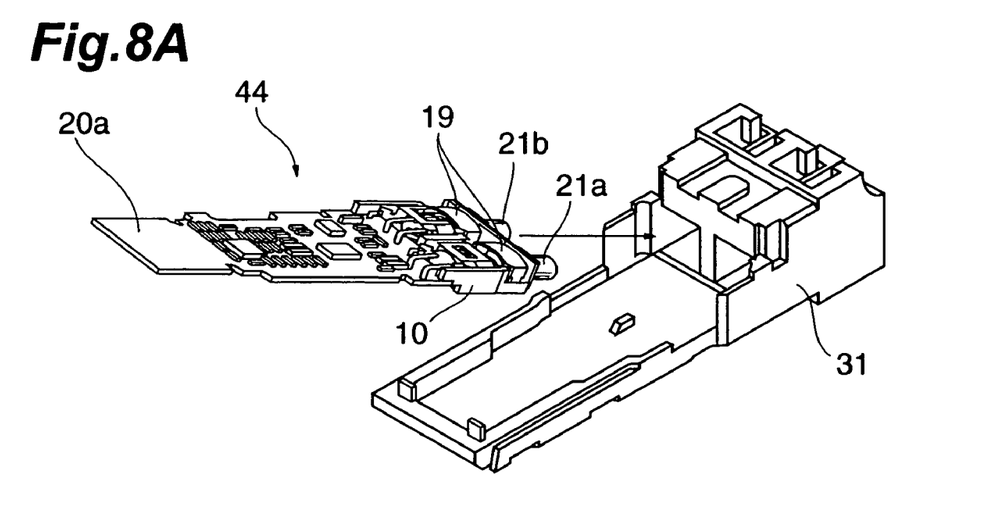
FIGS. 8A, 8B, and 8C are views showing a process of inserting the assembly into the lower casing.
Figure 8B:
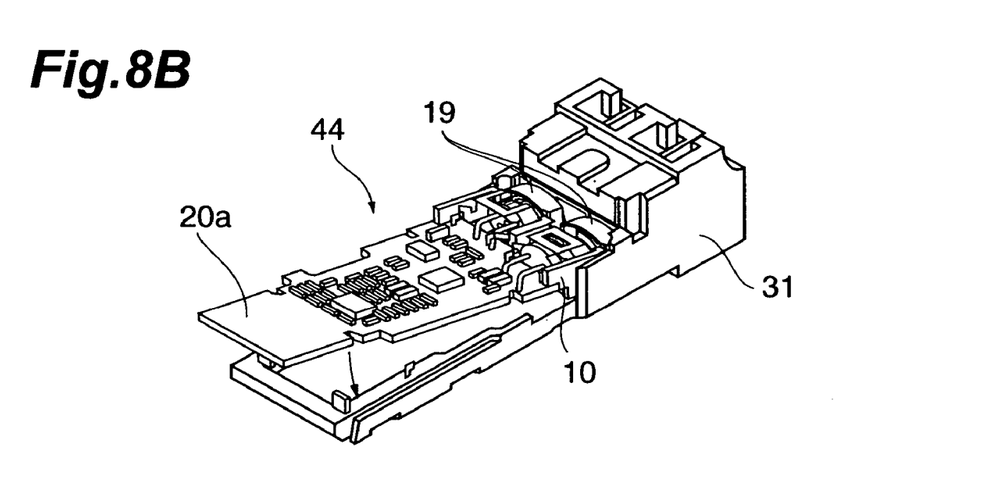
Figure 8C:
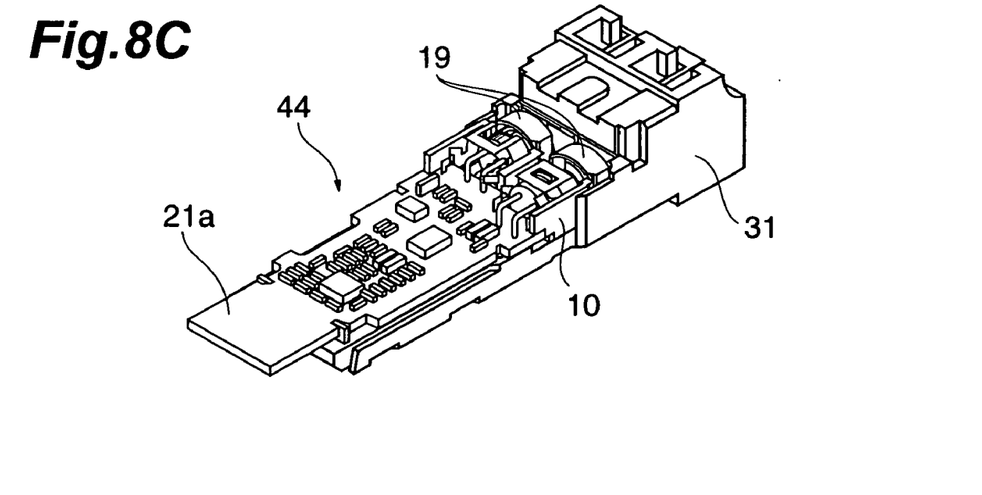

FIGS. 8A, 8B, and 8C are views showing a process of inserting the assembly 44 into the lower casing 31. These drawings do not depict the second substrate 20b and the flexible substrate 20c. First, as shown in FIG. 8A, the assembly 44 is obliquely inserted into the lower casing 31 such that the optical sub-assembly 21 is inserted into the openings 31m of the receptacle 31j from the inside.

After the optical sub-assembly 21 is inserted into the openings 31m, the circuit board 20 is moved toward the mounting surface 30i such that the circuit board 20 becomes parallel to the lower face of the lower casing 31 as shown in FIG. 8B.

Thereafter, the projection 31e of the lower casing 31 and the surface 13e of the center wall 13b of the block 10 are brought into contact with each other, so as to position and secure the optical sub-assembly 21 (see FIG. 8C).

Here, as shown in FIG. 3B, the block 10 is formed with abutting surfaces 16a to 16d for bringing the block 10 into contact with the lower casing 31 without any gap.

The first abutting surface 16a is formed between the two openings 12a, 12b of the front wall 12. The first abutting surface 16a is disposed so as to come into contact with the rear end part 31k of the receptacle 31j.

The second abutting surfaces 16b are formed at the front wall 12 so as to project sideways therefrom.

The third abutting surfaces 16c are formed at the front wall 12 so as to project downward therefrom. The fourth abutting surfaces 16d are formed at the respective bottom faces of the outer walls 13a and 13c so as to project downward therefrom.

When the assembly 44 is set in the lower casing 31, the first abutting surface 16a comes into contact with the partition 31a between the two openings (see FIG. 7).

The second abutting surfaces 16b come into contact with the side walls 31b of the lower casing 31. As a consequence, the block 10 is held between a pair of side walls 31b.

The third abutting surfaces 16c come into contact with the bottom face 31c of the lower casing 31, whereas the fourth abutting surfaces 16d come into contact with edge portions 31d of the lower casing 31, whereby the block 10 is stably held by the lower casing 31.

Figure 9:
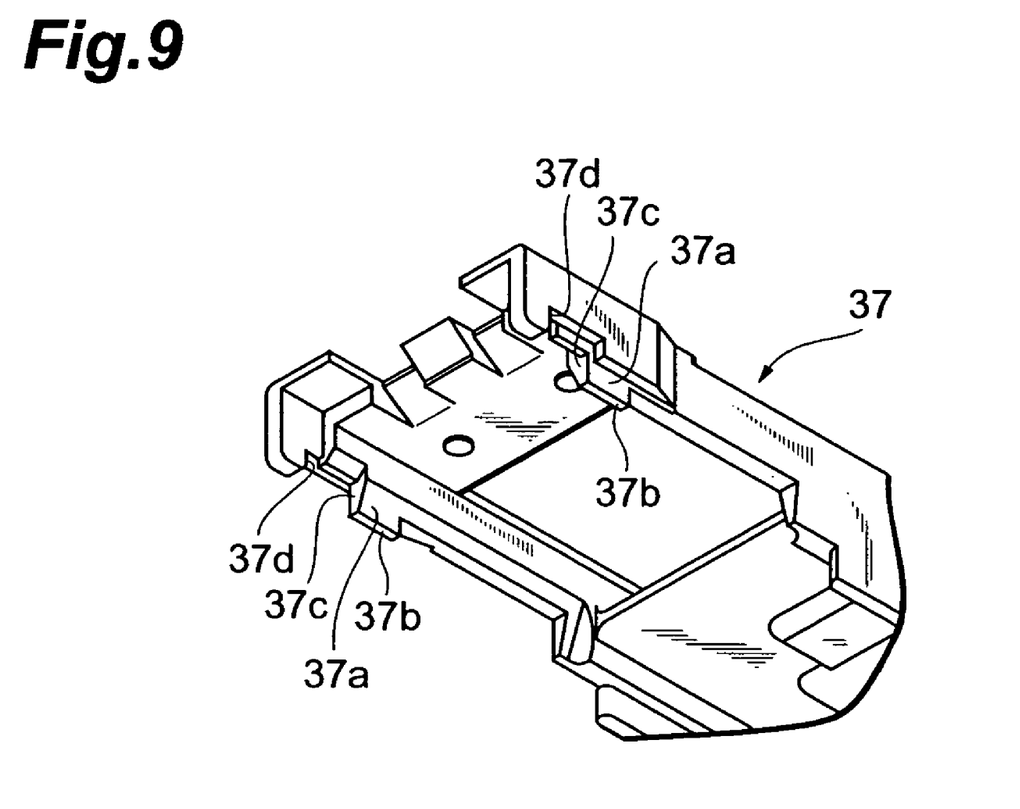
FIG. 9 is a partial perspective view showing the upper casing in the first embodiment.

Subsequently, the upper casing 37 is put on the lower casing 31 mounted with the assembly 44. FIG. 9 is a partial perspective view showing the upper casing 37.

The upper casing 37 constitutes an outer case of the optical module 1. The first substrate 20a is held between the upper casing 37 and lower casing 31, whereas the second substrate 20b is mounted thereon.

As shown in FIG. 9, engagement structures 37a to 37d are formed on each side of the upper casing 37. As shown in FIGS. 3A and 3B, both side walls 13a, 13c of the block 10 have respective cutouts. The protrusions 37a are inserted into these cutouts, and press the block 10. The surfaces 37b, 37c of the protrusions 37a come into contact with the surfaces 12d, 12e of the block 10 exposed at the cutouts, thereby determining the positions of the block 10 and upper casing 37 with respect to each other in one direction.

As shown in FIG. 7, on the other hand, both side walls of the lower casing 31 have respective engagement structures 31n as cutting out these side walls. The engagement structures 37d of the upper casing 37 engage their corresponding engagement structures 31n of the lower casing 31, thereby positioning the upper casing 37 and the lower casing 31 with respect to each other.

After the upper casing 37 is thus put on, the lower casing 31 is covered with the cover 32, whereby the optical module 1 is completed.

Second Embodiment

Figure 11:
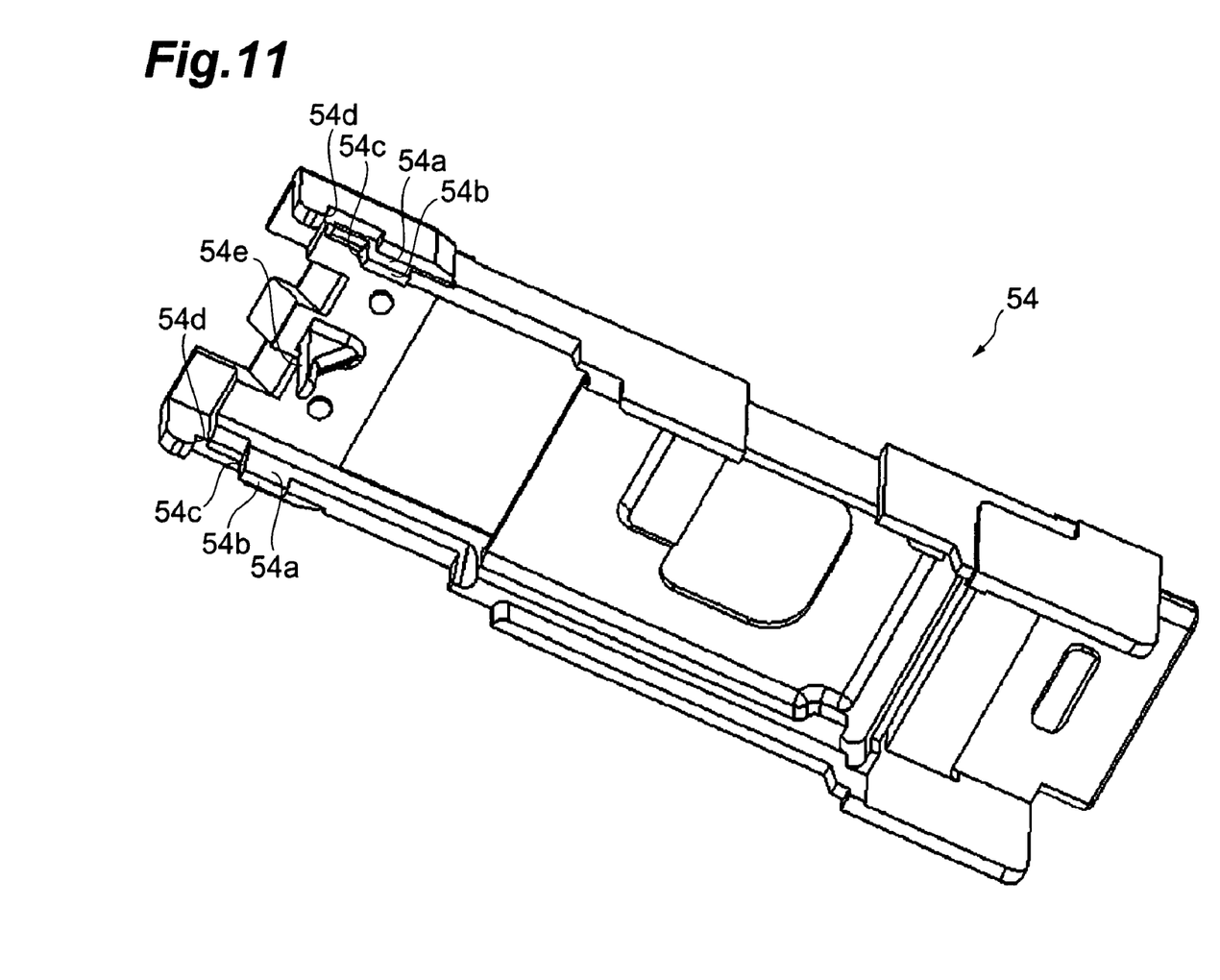
FIG. 11 is a perspective view showing the upper casing in a second embodiment.

The optical module 1a in accordance with a second embodiment will now be explained. FIG. 11 is an exploded perspective view of the optical module 1a of the second embodiment. As shown in FIG. 11, the optical module 1a comprises a block 10, a transmitting optical sub-assembly 21a and a receiving optical sub-assembly 21b (collectively referred to as "optical sub-assembly 21"), a first substrate 20a and a second substrate 20b (collectively referred to as "circuit board 20") which are used for driving the optical sub-assembly 21, a housing 30 for enclosing the optical sub-assembly 21 and circuit board 20, holders 19, brackets 33, a shield 34, an actuator 39, a fin 38, and heat transfer sheets 40, 42. The optical module 1a differs from that of the structure embodiment in the form of the upper casing.

The positioning part 54e comes into contact with the surface 12g of the front wall 12 exposed at the cutout formed in the center wall 13b of the block 10. This can define mutual positional relationships between the block 10, upper casing 54, and lower casing 31 together with engagement structures 54a to 54d provided at both side walls of the upper casing 54, cutout structures formed in both side walls 13a, 13c of the block 10, and cutout structures 31n formed in both side walls of the lower casing 31.

By using the block 10, the optical modules 1, 1a in accordance with the foregoing embodiments can position the optical sub-assembly 21 and circuit board 20 before mounting them to the lower casing 31. Therefore, the optical sub-assembly 21 and the circuit board 20 can efficiently be fixed to each other on the outside of the housing 30.

Since the block 10 itself can be assembled in the lower casing 31 with the optical sub-assembly 21 and circuit board 20 in the state where the optical sub-assembly 21 and circuit board 20 are positioned with respect to each other, each of the optical modules 1 and 1a can be assembled easily.

In the foregoing embodiments, the holders 19 are provided as a positioning member, so that the optical sub-assembly 21 can be secured after being inserted into the openings 12a, 12b of the block 10, whereby the optical sub-assembly 21 can be reliably positioned and fixed to the circuit board 20.

What is claimed is:

1. An optical module comprising:
   a housing having a lower easing integrating with a receptacle and a mount, an upper easing engaged with the lower casing, and a cover for covering the upper casing;
   a block mounted on the lower casing, the block including a center wall and a pair of side walls disposing the center wall therebetween and a mounting portion, the center wall providing a substrate supporting portion and each of the pair of side walls providing a substrate pressing portion;
   a optical sub-assembly mounted on the block and optically coupled with an optical connector mated with the receptacle; and
   a substrate mounted on the mount of the lower casing and supported by the block, the substrate being electrically connected to the optical sub-assembly,
   wherein the block supports the optical subassembly in the mounting portion and the substrate by sandwiching between the substrate supporting portion and the substrate pressing portion to define relative positions between the block, the optical sub-assembly and the substrate.

2. The optical module according to claim 1, wherein the block is made of a resin.

3. An optical module comprising:
   a housing having a lower casing integrating with a receptacle and a mount, an upper casing engaged with the lower casing, and a cover for covering the upper casing;
   a block mounted on the lower casing and including a mounting portion;
   an optical sub-assembly mounted on the mounting portion and optically coupled with an optical connector mated with the receptacle; and
   a substrate mounted on the mount of the lower casing and supported by the block, the substrate being electrically connected with the optical sub-assembly,
   wherein the receptacle has a surface with an opening for abutting against a surface of the block with an opening corresponding to the opening provided in the surface of the receptacle, the optical sub-assembly being inserted into the opening of the surface of the receptacle and the opening of the block, and
   wherein the lower casing has a projection on the mount for holding the block between a side face of the projection and the surface of the receptacle such that the surface of the block abuts against the surface of the receptacle.

4. The optical module according to claim 3, wherein the block provides a first cutout, the lower casing provides a second cutout, and the upper casing provides first and second protrusions for engaging with the first and second cutouts, respectively such that the surface of the block abuts against the surface of the receptacle.

5. The optical module according to claim 4,
   wherein the block includes a center wall and a pair of side walls, the side walls disposing the center wall therebetween providing the first cutout, the mounting portion being disposed between the center wall and one of side walls.

6. The optical module according to claim 4, wherein the second cutout is formed in a side wall of the lower casing.

7. The optical module according to claim 3,
   wherein the upper casing includes a projection and the block includes a center wall with a cutout,
   the projection being in contact with a cross section of the cutout such that the surface of the block abuts against the surface of the receptacle.

8. The optical module according to claim 3,
   further comprising a holder for holding the optical sub-assembly by surrounding the optical sub-assembly and pressing the optical sub-assembly to the block.

9. The optical module according to claim 3,
   wherein the block is made of a resin.

10. An optical module comprising:
an optical sub-assembly having leads and mounted with an optical device;
a substrate electrically connected to the leads of the optical sub-assembly;
a resin block including a front wall with an opening to insert one end of the optical sub-assembly thereinto, a center wall with a substrate supporting portion and a first cutout, and a pair of side walls disposing the center wall therebetween, each of the side walls providing a substrate pressing portion for pressing the substrate and a second cutout, the substrate supporting portion and the substrate pressing portion fixing the substrate by sandwiching the substrate therebetween;
a lower cashing building with a receptacle and a mount receiving an optical connector holding an optical fiber and providing a surface with an opening for inserting the one end of the optical sub-assembly thereinto, the mount mounting the substrate and providing a projection for sandwiching the block with the surface of the receptacle such that the front wall of the block abuts against the surface of the receptacle, the lower casing providing a third cutout in a side wall thereof; and
an upper casing providing a first protrusion to engage with the first cutout provided in the side wall of the resin block, a second protrusion to engage with the third cutout provided in the side wall of the lower casing, and a third protrusion to engage with the second cutout provided in the center wall of the resin block such that the front wall of the resin block abuts against the surface of the receptacle.

11. A method for manufacturing an optical module including an optical sub-assembly, a block, a substrate, a lower casing and an upper casing, the method comprising steps of:
(a) mounting the optical sub-assembly on the block such that a leading end of the optical sub-assembly is inserted into an opening provided in a front wall of the block;
(b) securing the substrate to the block such that a substrate supporting portion provided in the block and a substrate pressing portion provided in the block sandwiches the substrate therebetween;
(c) electrically connecting the substrate with leads of the optical subassembly;
(d) installing the block mounting the optical sub-assembly electrically connected with the substrate in the lower casing including a receptacle such that the leading end of the optical subassembly inserted into the opening of the block enters an opening formed in a surface of the receptacle; and
(e) assembling the upper casing with the lower casing such that the front wall of the block abuts against the surface of the receptacle.

* * * * *